US012706678B2

(12) United States Patent
Vassilieva et al.

(10) Patent No.: US 12,706,678 B2
(45) Date of Patent: Aug. 11, 2026

(54) OPTICAL SIGNAL PROCESSING

(71) Applicant: 1FINITY Inc., Kawasaki (JP)

(72) Inventors: Olga I Vassilieva, Plano, TX (US); Inwoong Kim, Allen, TX (US); Paparao Palacharla, Richardson, TX (US)

(73) Assignee: 1FINITY Inc., Kawasaki (JP)

( * ) Notice: Subject to any disclaimer, the term of this patent is extended or adjusted under 35 U.S.C. 154(b) by 264 days.

(21) Appl. No.: 18/427,682

(22) Filed: Jan. 30, 2024

(65) Prior Publication Data

US 2025/0247157 A1 Jul. 31, 2025

(51) Int. Cl.
*H04J 14/02* (2006.01)
*H04B 10/69* (2013.01)

(52) U.S. Cl.
CPC .... *H04B 10/6971* (2013.01); *H04J 14/02762* (2023.08)

(58) Field of Classification Search
CPC . H04J 14/0226; H04J 14/026; H04J 14/02762
See application file for complete search history.

(56) References Cited

U.S. PATENT DOCUMENTS 6,580,536 B1 * 6/2003 Chraplyvy ........ H04J 14/02216 398/91
9,515,733 B2 * 12/2016 Akasaka .......... H04B 10/07955
2017/0214488 A1 * 7/2017 Vassilieva ............. H04L 1/0041
2018/0359047 A1 * 12/2018 Vassilieva .......... H04B 10/5057
2020/0244388 A1 * 7/2020 Rafique ............... H04J 14/0298

OTHER PUBLICATIONS

D. Che, W. Shieh "Entropy loading: Multi-Carrier Constellation Shaping for Colored-SNR Optical Channels", OFC 2017, Th5B.4.
"Maximizing the Capacity-Reach of 800G Generation Coherent: Baud Rates, Features, and Modem SNR" (White Paper by Infinera) 2020.
L. Galdino et al., "Optical FibreCapacity Optimization via Continuous Bandwidth Amplification and Geometric Shaping", JLT 2020.

* cited by examiner

*Primary Examiner* — Nathan M Cors
(74) *Attorney, Agent, or Firm* — Maschoff Brennan

(57) ABSTRACT

Operations include generating an optical signal having a plurality of subcarriers. The operations further include performing a signal-to-noise ratio (SNR) equalization process with respect to the plurality of subcarriers based on an SNR factor associated with propagation of the optical signal along an optical signal path, the SNR equalization process including respectively adjusting, for one or more individual subcarriers of the plurality of subcarriers, one or more of: a forward-error-correction rate respectively corresponding to the one or more individual subcarriers; or a symbol rate respectively corresponding to the one or more individual subcarriers.

17 Claims, 8 Drawing Sheets

OPTICAL SIGNAL PROCESSING

FIELD

The embodiments discussed in the present disclosure are related to optical signal processing.

BACKGROUND

In general, optical signal communication is achieved by passing processed optical signals along a transmission media to communicate data from one point to another. For example, an optical signal may be processed to increase range or overcome degradation.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In some aspects, the techniques described herein relate to a system including: an optical transponder configured to perform operations, the operations including: generating an optical signal including a plurality of subcarriers; and performing a signal-to-noise ratio (SNR) equalization process with respect to the plurality of subcarriers based on an SNR factor associated with propagation of the optical signal along an optical signal path, the SNR equalization process including respectively adjusting, for one or more individual subcarriers of the plurality of subcarriers, one or more of: a forward-error-correction rate respectively corresponding to the one or more individual subcarriers; or a symbol rate respectively corresponding to the one or more individual subcarriers.

In some aspects, the techniques described herein relate to a method including: generating an optical signal including a plurality of subcarriers; and performing a signal-to-noise ratio (SNR) equalization process with respect to the plurality of subcarriers based on an SNR factor associated with propagation of the optical signal along an optical signal path, the SNR equalization process including respectively adjusting, for one or more individual subcarriers of the plurality of subcarriers, one or more of: a forward-error-correction rate respectively corresponding to the one or more individual subcarriers; or a symbol rate respectively corresponding to the one or more individual subcarriers.

In some aspects, the techniques described herein relate to a non-transitory computer-readable storage medium configured to store instruction that, in response to being executed, causes a system to perform operations, the operations including: generating an optical signal including a plurality of subcarriers; and performing a signal-to-noise ratio (SNR) equalization process with respect to the plurality of subcarriers based on an SNR factor associated with propagation of the optical signal along an optical signal path, the SNR equalization process including respectively adjusting, for one or more individual subcarriers of the plurality of subcarriers, one or more of: a forward-error-correction rate respectively corresponding to the one or more individual subcarriers; or a symbol rate respectively corresponding to the one or more individual subcarriers. The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Optical signal communication provides data from one point to another via encoding of that data in light. Optical signal communication may incorporate a digital approach in which information is encoded and transferred in the form of bits and symbols. Data transmission via optical signals occurs in a variety of different network types. For example, a long-haul network may be a network in which transmission distance is a significant factor affecting the optical signal. In another example, a metro network may be a network in which switches, multiplexers, and/or other transmission devices are a significant factor affecting the optical signal.

Optical signal processing may be performed to encode data to be communicated in the optical signal. Optical signal processing may also be performed to provide an optical signal with sufficient range, power, clarity, and the like for the data to be received and understood by a receiver through the corresponding network.

To facilitate higher capacity, an optical signal may include multiple subcarrier signals that are combined into a single signal for transmission via subcarrier multiplexing. The subcarrier signals may respectively include subcarrier waves having corresponding subcarrier frequencies that each include information modulated thereon. In the present disclosure, reference to a "subcarrier" may include a corresponding subcarrier frequency, a corresponding subcarrier wave, a corresponding subcarrier signal, and/or corresponding information modulated thereon. The individual subcarrier signals may be combined and transmitted as a single optical signal. Subcarrier multiplexing therefore allows for a single transmission signal to include multiple signals that each respectively include information to facilitate higher data transmission rates.

Figure 1:
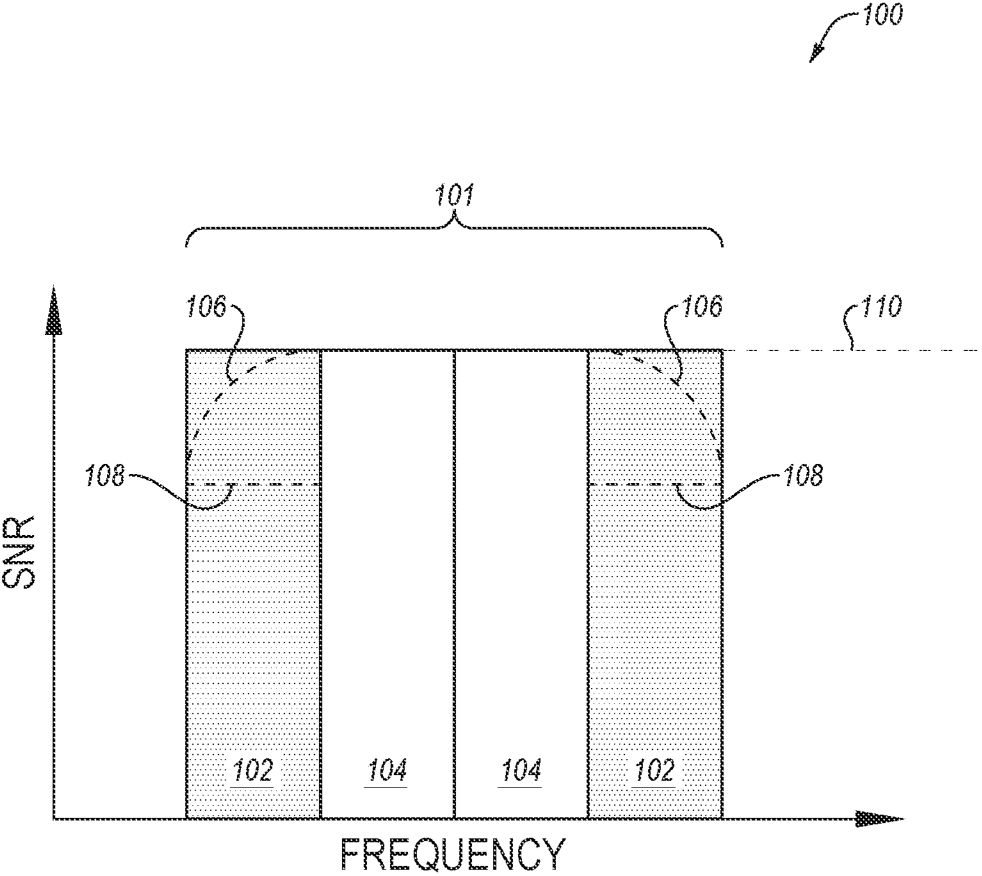
FIG. 1 illustrates an example correlation graph corresponding to passband narrowing on an optical signal.

For example, FIG. 1 illustrates an example correlation graph 100 corresponding to signal degradation on an optical signal 101 according to one or more embodiments. In the graph 100, subcarriers (edge subcarriers 102 and center subcarriers 104) of the optical signal 101 are displayed in the graph 100 based on signal-to-noise ratio (SNR) and frequency. In the illustrated embodiment, an example number of subcarriers is illustrated. However, because the illustrated embodiment is an example, other embodiments may include fewer or more edge and/or center subcarriers.

As illustrated, edge subcarriers 102 are illustrated to either side of the center subcarriers 104 to correspond to lower and higher portions of the frequency range than the center subcarriers 104. In some cases, optical networks may suffer from one or more different types of signal degradation affecting at least a portion of the optical signal (e.g., one or more subcarriers of the optical signal). For example, the optical signal 101 of FIG. 1 may be affected by passband narrowing. Passband narrowing can affect the edge subcarriers 102 as one or more edge subcarriers 102 may have a portion of the subcarrier signal clipped or degraded resulting from passage of the optical signal through components along the optical path. An example of this is illustrated as passband narrowing 106. The loss of signal from the passband narrowing 106 of the edge subcarriers 102 can impact the signal-noise ratio (SNR) of the edge subcarriers 102. The change in the SNR may result in reduced range for the affected edge subcarrier 102.

One type of optical network affected by passband narrowing is a metro network. A metro network is an optical network that may use subcarrier multiplexing and may include a network having a significant presence of switches, multiplexers, or other devices or components. For example, a metro network may include ROADMs and/or other switches or devices which may cause passband narrowing 106 affecting one or more of the edge subcarriers 102. The passband narrowing 106 may reduce an effective reach of the edge subcarriers 102 to a reduced SNR range 108 which is less than an optimal SNR range 110. The resulting decrease in the SNR range of the edge subcarriers 102 and discrepancy of the SNR range of the edge subcarriers 102 relative to the center subcarriers 104 results in a lower useful SNR range of the optical signal 101, generally.

Figure 2:
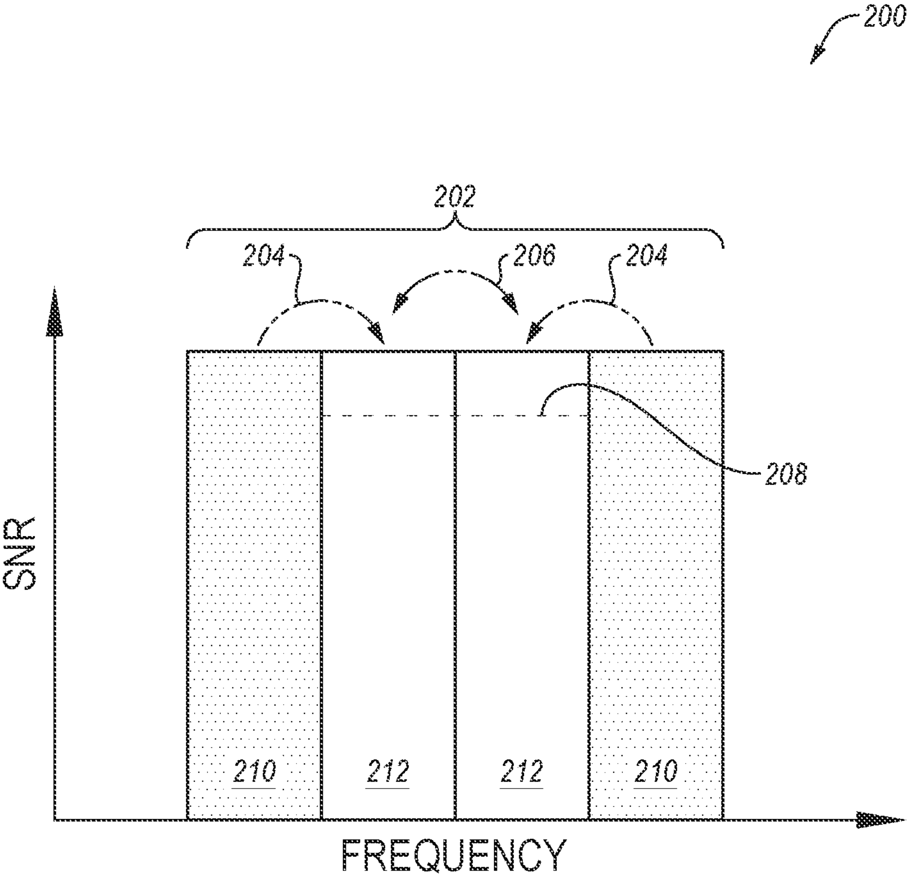
FIG. 2 illustrates an example correlation graph corresponding to frequency bandwidth modification for passband narrowing on an optical signal.

As another example, FIG. 2 illustrates an example correlation graph 200 corresponding to non-linear interference (NLI) in an optical signal 202 according to one or more embodiments. In some embodiments, non-linear interference (NLI) may be a significant impediment to the reach of the optical signal 202. An example of NLI is cross-phase modulation.

In some embodiments, the NLI in the optical signal 202 may affect the center subcarrier(s) 212 in the form of edge subcarrier contributed NLI 204 in which edge subcarriers 210 impart interference on the center subcarrier(s) 212. In some embodiments, the NLI may be center subcarrier contributed NLI 206 in which one or more of the center subcarriers 212 impart interference on another of the one or more center subcarriers 212. In some embodiments, the NLI negatively impacts an SNR of the center subcarriers 212 such that the resultant SNR level 208 of the center subcarrier(s) 212 is deteriorated. In some embodiments, the resultant SNR level 208 of the center subcarrier(s) 212 is misaligned with the edge subcarriers 210. However, as discussed in further detail in the present disclosure, it may be desirable to equalize the SNR between the center subcarrier(s) 212 and the edge subcarriers 210. Equalized SNR across all subcarriers may allow for each subcarrier to have equivalent range and resilience to signal degradation thereby providing uniform range and signal integrity at range.

One example of an optical network, in which NLI may be present, is a long-haul (LH) network. A LH network may include an optical signal path that crosses significant distances. An effect of crossing those significant distances may include the introduction of NLI affecting the center subcarriers 212 of the optical signal.

In some example representations of an optical signal, subcarriers may be organized into constellations. A constellation is a visualization of the different subcarriers in an optical signal. Each location in the constellation is determined by the phase and amplitude of the corresponding subcarrier. For example, phase may be represented by the angle of the point from zero while amplitude is represented by distance from the center of the constellation.

One example of an optical signal is a probabilistically shaped quadrature amplitude modulation (PS-QAM) signal. In this model, a data rate of each subcarrier of the optical signal may be determined as a product of an information rate (info rate) and a symbol rate for each respective subcarrier. For example, the relations may be characterized as:

$$\text{Data Rate} = 2(\text{Info Rate})(\text{Symbol Rate})$$

Multiple factors may contribute to the info rate of the optical signal subcarriers. In some examples, the info rate may be characterized as:

$$\text{Info Rate} = H - (1 - c)(m)$$

where H is the entropy value of the constellation, c is a forward-error-correction (FEC) rate, and m is a modulation order with $m=\log_2 M$ where M is a cardinality size.

Based on the relationship of the FEC rate and the info rate, an increase in the FEC rate of the same info rate subcarrier results in reduced entropy of the subcarrier resulting in an increase in shaping and an increase in peak power, or peak-to-average power ratio (PAPR), of the subcarrier. Increases in shaping and PAPR may lead to larger negative impacts on the optical signal through NLI and reduced signal-to-noise ratio (SNR).

According to one or more embodiments of the present disclosure, an SNR equalization process may be performed with respect to an optical signal by reducing the effects of signal degradation in the subcarriers. To improve the performance of one or more affected subcarriers, the info rate of that subcarrier may be adjusted. Additionally, or alternatively, the symbol rate of the one or more affected subcarriers may be adjusted. A decrease in the FEC rate yields an increase in entropy. In some embodiments, an increase in the symbol rate commensurate with the decrease in the info rate maintains the overall data rate and provides a gain in the required SNR.

Figure 3:
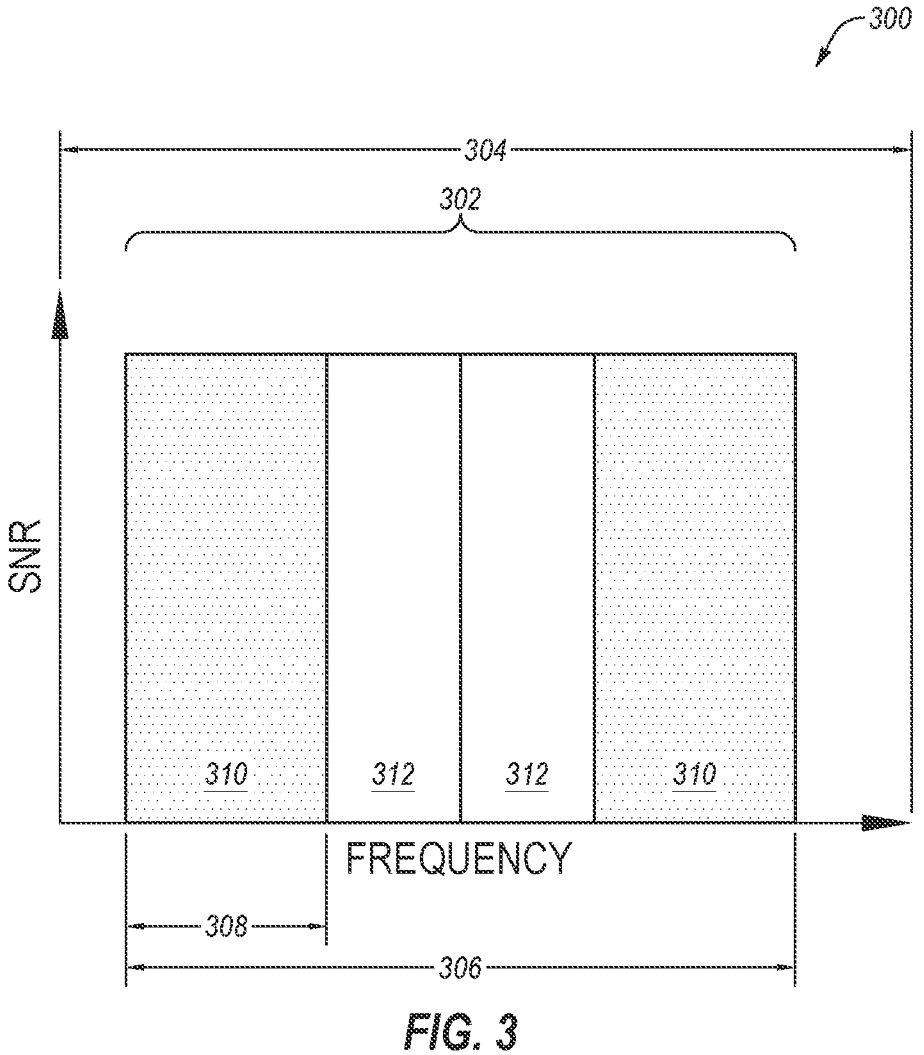
FIG. 3 illustrates an example correlation graph corresponding cross-phase modulation on an optical signal.

FIG. 3 illustrates an example correlation graph 300 corresponding to frequency bandwidth modification for passband narrowing on an optical signal 302, according to one or more embodiments. In some embodiments, the impact of the passband narrowing on the optical signal 302 may be reduced by lowering the FEC rate of the edge subcarriers 310. A lower FEC rate in the edge subcarriers 310 results in a lower required SNR (RSNR) for the edge subcarriers 310 due to smaller PAPR. Because the FEC rate is lower, the entropy for the edge subcarriers 310 is higher for the same info rate. The adjustment to the SNR of the edge subcarriers may bring the SNR of the edge subcarriers 310 into, or closer to, alignment with the center subcarriers 312. More closely aligning the SNR of both the edge subcarriers 310 and the center subcarriers 312 allows for uniformity of range in the optical signal 302.

In some embodiments, a lower FEC rate and a higher symbol rate may be set for the edge subcarriers 310. In some embodiments, the symbol rate may be adjusted based on the reduction in the info rate to maintain the same net data rate as before manipulation of the FEC rate. In other words, an overall bandwidth 306 of the optical signal 302 may be maintained by setting a smaller FEC rate and a larger symbol rate. In some embodiments, the reduced FEC rate and increased symbol rate allow for an increase subcarrier bandwidth 308 in the edge subcarriers 310. The increased bandwidth 308 provides greater resilience in the edge subcarriers 310 to passband narrowing because a lower overall percentage of the edge subcarrier 310 is lost to passband narrowing. This allows for the SNR of the edge subcarriers 310 to be more closely aligned with the center subcarriers 312.

In some embodiments, the increase in bandwidth 308 of the edge subcarriers 310 can be accommodated by the size of the allocated slot 304 for the optical signal 302. While the increase in bandwidth 306 may include an increased slot occupancy, the slot occupancy of the optical signal 302 can be maintained comfortably within the allocated slot 304 through balancing the info rate (FEC or other component) and symbol rate to give the optical signal 302 an appropriate bandwidth.

In some embodiments, the optical signal 302 may occupy the entire allocated slot 304 or enough of the allocated slot 304 to be restrictive on bandwidth expansion of the optical signal 302. In some embodiments where the allocated slot 304 is restrictive, the center subcarrier(s) 312 may be modified to have a smaller bandwidth to accommodate the increased edge subcarrier bandwidth 308. For example, the center subcarrier(s) 312 may be modified by setting a smaller FEC rate and a smaller symbol rate. Modification of both edge subcarriers 310 and the center subcarrier(s) 312 can allow for improved resilience to passband narrowing RSNR matching between edge subcarriers 310 and center subcarrier(s) 312, and/or strategic subcarrier bandwidth allocation within the optical signal 302.

Figure 4:
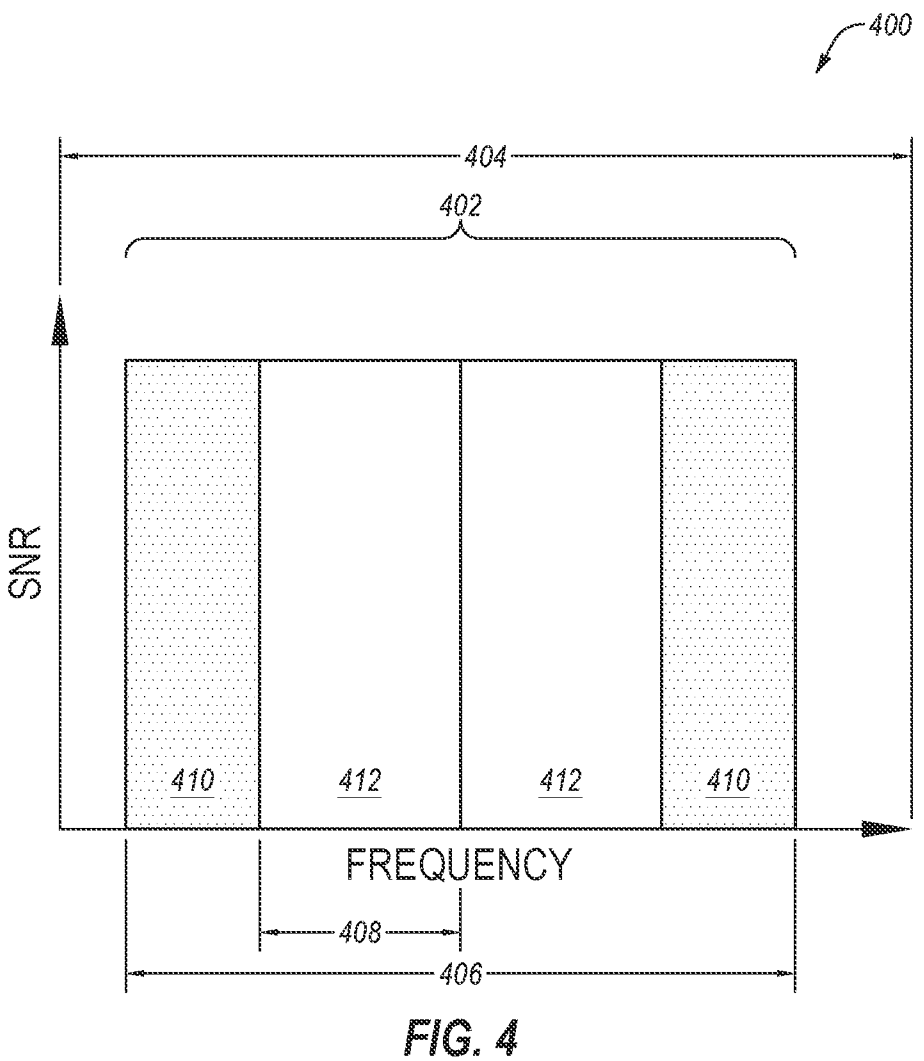
FIG. 4 illustrates an example correlation graph corresponding to frequency bandwidth modification for cross-phase modulation on an optical signal.

FIG. 4 illustrates an example correlation graph 400 corresponding to frequency bandwidth modification for NLI on an optical signal 402 according to one or more embodiments. In some embodiments, the impact of the NLI on the optical signal 402 may be reduced by lowering the FEC rate of the center subcarriers 412. A lower FEC rate in the center subcarriers 412 results in a lower required SNR (RSNR) for the center subcarriers 412. Because the FEC rate is lower, the entropy for the center subcarriers 412 is higher and the SNR of both the edge subcarriers 410 and the center subcarriers 412 are more aligned providing greater uniformity of range.

In some embodiments, a lower FEC rate and a higher symbol rate may be set for the center subcarriers 412. In some embodiments, the symbol rate may be adjusted based on the reduction in the info rate to maintain the same net data rate as before manipulation of the FEC rate. In other words, within an allocated slot 404, an overall bandwidth 406 of the optical signal 402 may be maintained by setting a smaller FEC rate and a larger symbol rate. In some embodiments, the reduced FEC rate and increased symbol rate allow for an increased subcarrier bandwidth 408 in the center subcarriers 412. The increased bandwidth 408 provides greater resilience in the center subcarriers 412 to NLI and more equalized subcarrier SNR across the optical signal 402.

In some embodiments, the increase in bandwidth 408 of the center subcarriers 412 can be accommodated by the size of the allocated slot 404 for the optical signal 402. While the increase in bandwidth 406 may include an increased slot occupancy, the slot occupancy of the optical signal 402 can be maintained comfortably within the allocated slot 404 through balancing the info rate (FEC or other component) and symbol rate to give the optical signal 402 an appropriate bandwidth.

In some embodiments, the optical signal 402 may occupy the entire allocated slot 404 or enough of the allocated slot 404 to be restrictive on bandwidth expansion of the optical signal 402. In some embodiments where the allocated slot 404 is restrictive, the edge subcarrier 410 may be modified to have a smaller bandwidth to accommodate the increased center subcarrier bandwidth 408. For example, the edge subcarrier 410 may be modified by setting a smaller FEC rate and a smaller symbol rate. Modification of both edge subcarriers 410 and the center subcarrier(s) 412 can allow for improved resilience to NLI, RSNR matching between edge subcarriers 410 and center subcarrier(s) 412, and/or strategic subcarrier bandwidth allocation within the optical signal 402.

Figure 5:
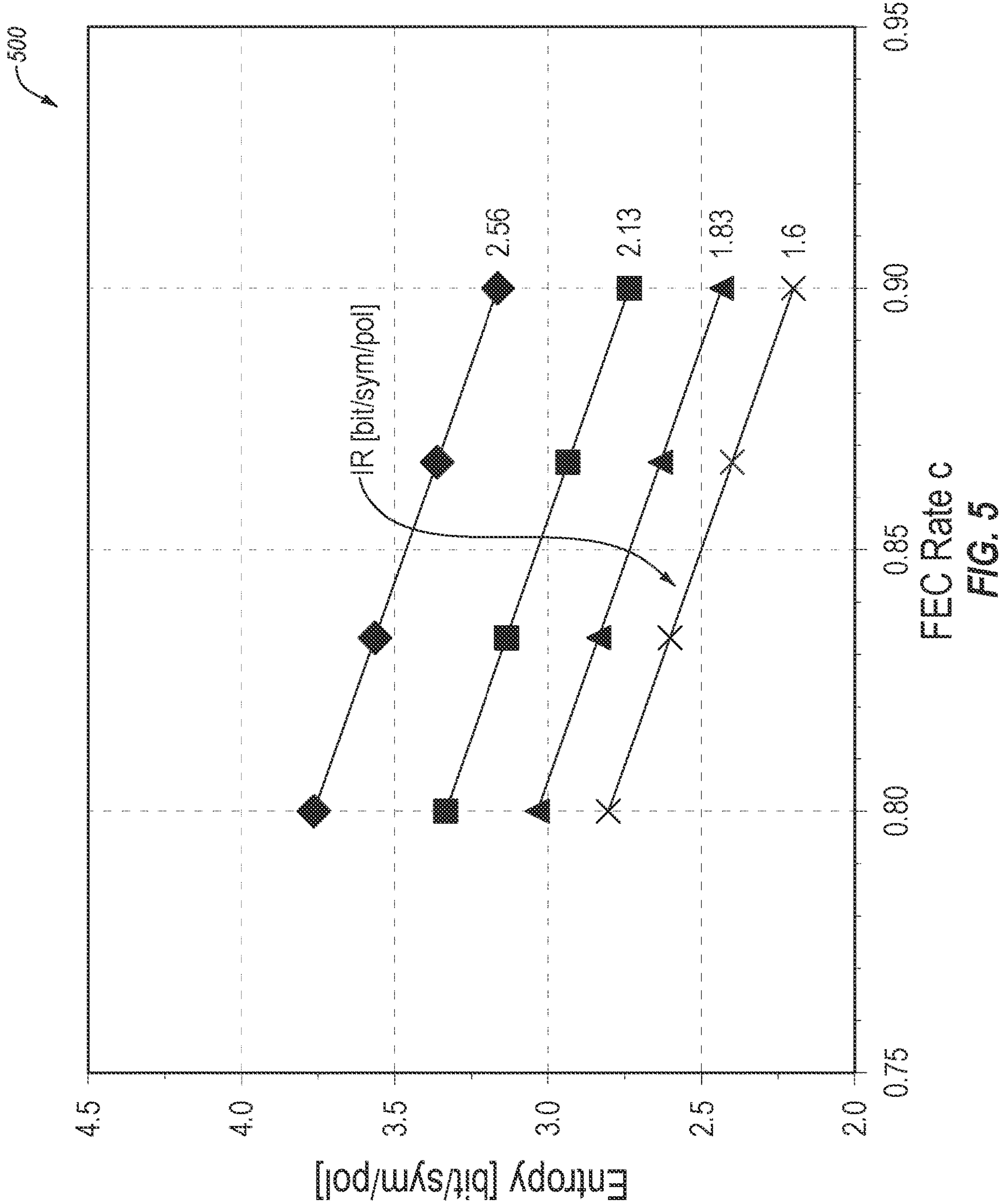
FIG. 5 illustrates an example correlation graph corresponding to information rate for an optical signal.

FIG. 5 illustrates an example correlation graph 500 corresponding to information rate for an optical signal according to one or more embodiments. In the illustrated example, the correlation between an FEC rate reduction, entropy, and info rate (IR) is illustrated. In particular, as an FEC rate is reduced, entropy increases for the same info rates, and SNR levels for each subcarrier (center and/or edge) may be brought into greater alignment. While, the illustrated data corresponds to a PS-DP-64QAM constellation, similar behavior (e.g. RSNR gain) may be demonstrated by other systems, constellations, etc. in response to FEC rate modification.

Figure 6:
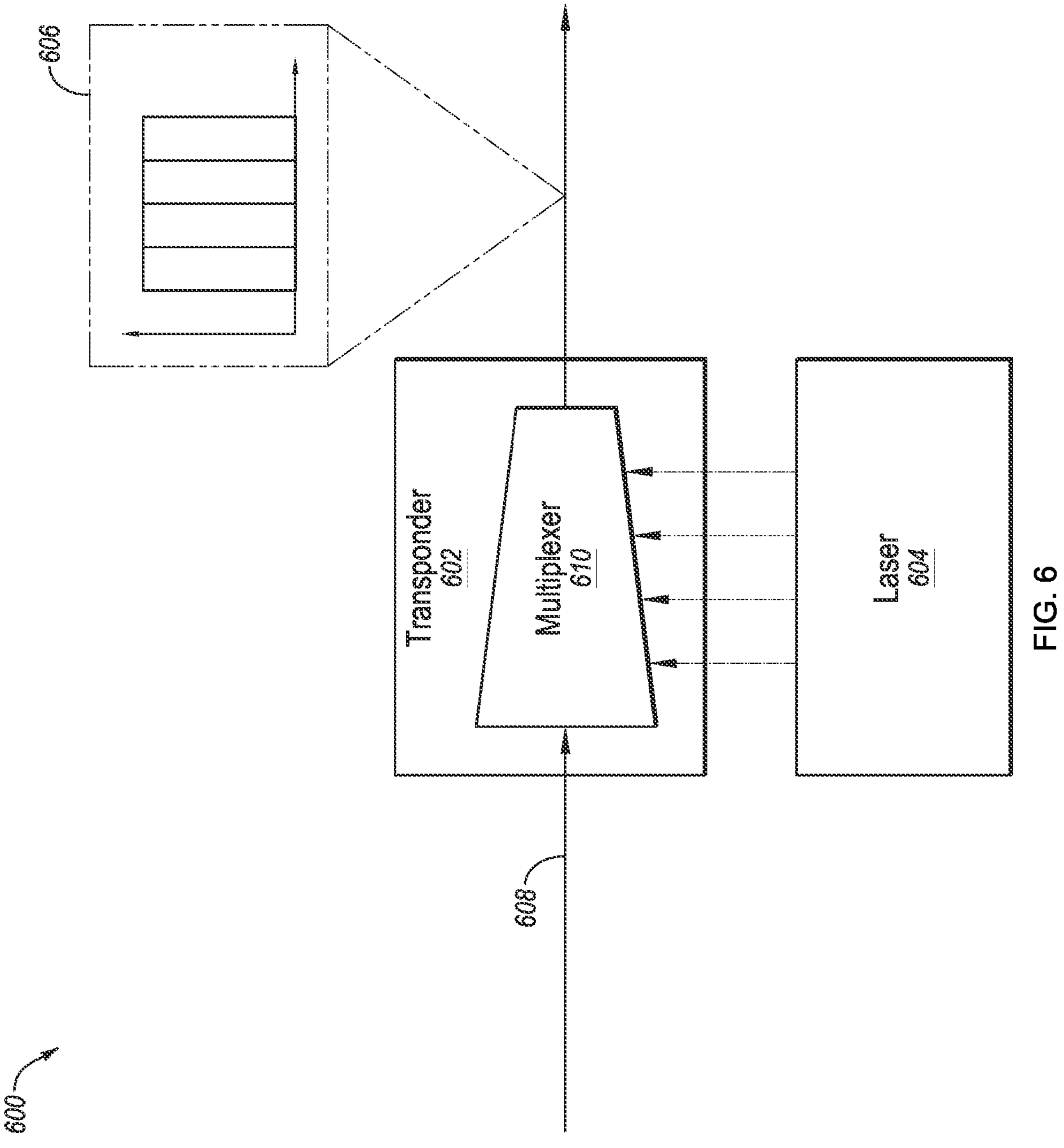
FIG. 6 is an example of an optical system.

FIG. 6 is an example of an optical system 600 ("system 600") according to one or more embodiments of the present disclosure. In some embodiments, the system 600 is configured to perform FEC manipulation to provide SNR equalization across subcarriers to at least partially mitigate signal degradation (e.g., passband narrowing, non-linear interference, etc.).

The system 600 includes a transponder 602, and a laser 604. While one or more of these components may be described in the singular, some embodiments may include arrays or other pluralities of one or more of the components illustrated or described. In some embodiments, the system 600 may be configured to generate an optical signal 606.

In some embodiments, instructions, power, and/or other signals may be provided to one or more of the transponder 602, and/or the laser 604. In some embodiments, the transponder 602 intakes a data signal 608 to be communicated via the optical signal 606. The transponder 602 may also intake laser light generated by the laser 604. The laser light may be received in multiple beams of light that may be used as subcarriers for the optical signal 606. In some embodiments, the transponder 602 may manipulate the laser light from the laser 604 by encoding the data signal onto the different beams of light which may be multiplexed by a multiplexer 610 of the transponder 602 to combine subcarriers to form the optical signal 606 for output by the transponder 602.

In some embodiments, the transponder 602 is configured to adjust an FEC rate, symbol rate, and/or other component of one or more subcarriers of the optical signal to at least partially mitigate a signal degradation associated with an optical signal path along which the optical signal 606 is to be transmitted. For example, if the optical signal path has an associated passband narrowing signal degradation component, the transponder 602 may manipulate one or more affected edge subcarriers to reduce an impact of the passband narrowing and better align the SNR of the various subcarriers. In another example, the transponder 602 may manipulate one or more center subcarriers to reduce an impact of NLI associated with the optical signal path by aligning the SNR of the various subcarriers of the optical signal 606.

In some embodiments, the transponder 602 may adjust an SNR of one or more subcarriers of the optical signal based on pre-determined adjustment values associated with the optical signal path. In other embodiments, the transponder 602 may adjust the one or more subcarriers based on dynamic values determined from a feedback loop, detector, calculation, machine learning model, or other deterministic technique or system. In some embodiments, the transponder 602 may be configured to apply a manual input value to modify the one or more subcarriers of the optical signal 606.

Figure 7:
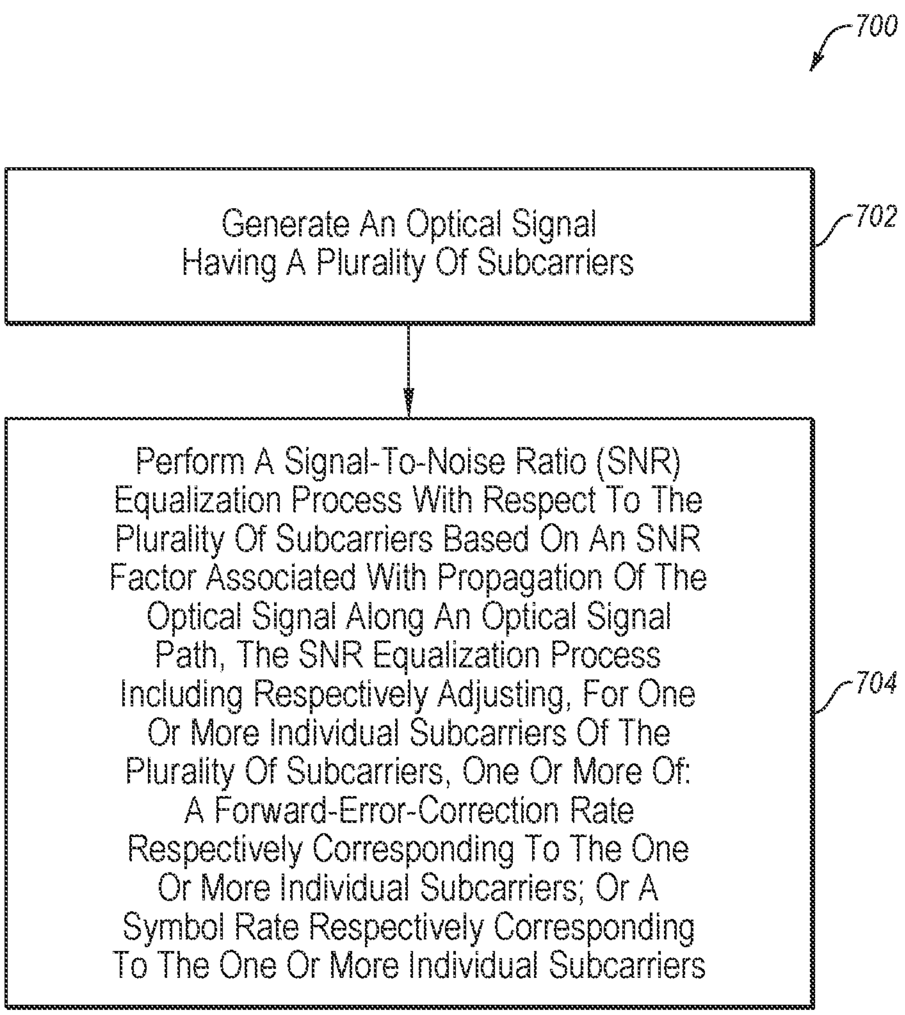
FIG. 7 is an example of a flowchart of a method of manipulating an optical signal.

FIG. 7 is an example of a flowchart of a method 700 of manipulating an optical signal, according to at least one embodiment. The method 700 may be performed by any suitable system, apparatus, or device. By way of example, the system 600 of FIG. 6, or the computing system of FIG. 8, described below, may perform one or more of the operations associate with the method 700. Although illustrated with discrete block, the various operations associated with one or more of the blocks of the method 700 may be divided into additional blocks, combined into fewer blocks, or omitted, depending on the particular implementation.

At block 702, an optical signal may be generated. The optical signal may include multiple subcarriers. In these and other embodiments, the generation may be performed using an integrated optical communication system or distributed optical components. In some embodiments, such generation may include one or more operations described with respect to FIGS. 1-6.

At block 704, a signal-to-noise ratio (SNR) equalization process may be performed with respect to the subcarriers based on an SNR factor associated with propagation of the optical signal along an optical signal path, the SNR equalization process including respectively adjusting, for one or more individual subcarriers of the plurality of subcarriers, one or more of: a forward-error-correction rate respectively corresponding to the one or more individual subcarriers; or a symbol rate respectively corresponding to the one or more individual subcarriers.

In some embodiments, the equalization process may include adjusting an overall bandwidth of the optical signal by adjusting a bandwidth of the one or more individual subcarriers or maintaining an overall bandwidth of the optical signal by making respective adjustments to the bandwidth of the subcarriers. The optical signal path may be a metro signal path having passband narrowing affecting an edge subcarrier or a long-haul path having non-linear interference affecting a center subcarrier.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 700 may include additional blocks or fewer blocks.

Embodiments described in the present disclosure may include the use of a special purpose or general-purpose computer (e.g., the transponder 602 of FIG. 6) including various computer hardware or software modules, as discussed in greater detail below. Further, as indicated above, embodiments described herein may be implemented using computer-readable media for carrying or having computer-executable instructions or data structures stored thereon, as described below.

Figure 8:
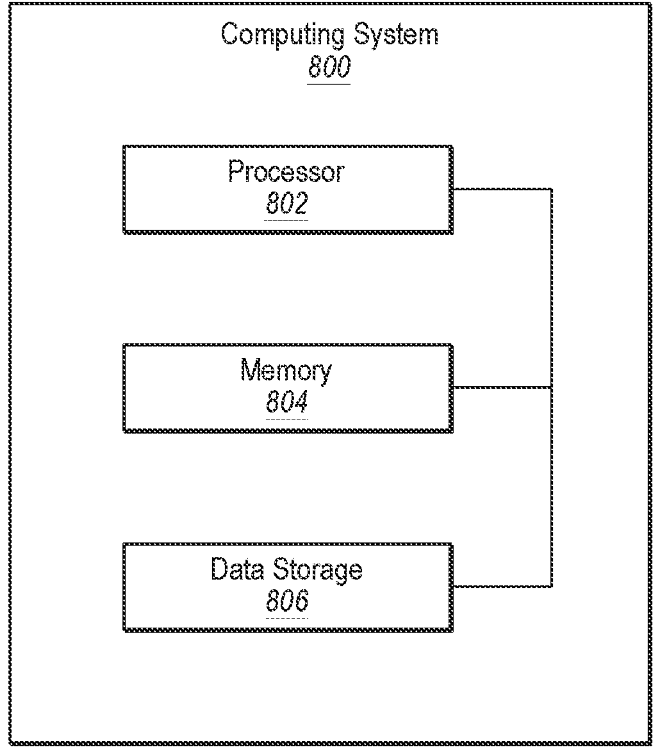
FIG. 8 illustrates a block diagram of an example computing system that may be used to manipulate an optical signal.

FIG. 8 illustrates a block diagram of an example computing system 800 that may be used to manipulate an optical signal, according to at least one embodiment of the present disclosure.

The computing system 800 may be configured to implement or direct one or more operations associated with one or more of the transponder 602, and/or the laser 604 of FIG. 6, in some embodiments. Additionally, or alternatively, the computing system 800 may be used to implement the method 700 of FIG. 7. The computing system 800 may include a processor 802, a memory 804, and a data storage 806. The processor 802, the memory 804, and the data storage 806 may be communicatively coupled.

In general, the processor 802 may include any suitable special-purpose or general-purpose computer, computing entity, or processing device including various computer hardware or software modules and may be configured to execute instructions stored on any applicable computer-readable storage media. For example, the processor 802 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 802 may include any number of processors configured to, individually or collectively, perform or direct performance of any number of operations described in the present disclosure. Additionally, one or more of the processors may be present on one or more different electronic devices, such as different servers.

In some embodiments, the processor 802 may be configured to interpret and/or execute program instructions and/or process data stored in the memory 804, the data storage 806, or the memory 804 and the data storage 806. In some embodiments, the processor 802 may fetch program instructions from the data storage 806 and load the program instructions in the memory 804. After the program instructions are loaded into memory 804, the processor 802 may execute the program instructions.

The processor 802 may fetch the program instructions of the transponder 602 from the data storage 806 and may load the program instructions of the transponder 602 in the memory 804. After the program instructions of the transponder 602 are loaded into memory 804, the processor 802 may execute the program instructions such that the computing system 800 and/or transponder 602 may implement the operations (e.g., perform the operations and/or cause performance of the operations) associated with the transponder 602 as directed by the instructions.

The memory 804 and the data storage 806 may include computer-readable storage media for carrying or having computer-executable instructions or data structures stored thereon. Such computer-readable storage media may include any available media that may be accessed by a general-purpose or special-purpose computer, such as the processor 802. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 802 to perform a certain operation or group of operations.

Modifications, additions, or omissions may be made to the computing system 800 without departing from the scope of the present disclosure. For example, in some embodiments, the computing system 800 may include any number of other components that may not be explicitly illustrated or described.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." This interpretation of the phrase "A or B" is still applicable even though the term "A and/or B" may be used at times to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A system comprising:
- an optical transponder configured to perform operations, the operations including:
  - generating an optical signal including a plurality of subcarriers; and
  - performing a signal-to-noise ratio (SNR) equalization process with respect to the plurality of subcarriers based on an SNR factor associated with propagation of the optical signal along an optical signal path, the SNR equalization process including respectively adjusting, for one or more individual subcarriers of the plurality of subcarriers:
    - a forward-error-correction (FEC) rate respectively corresponding to the one or more individual subcarriers; and
    - a symbol rate respectively corresponding to the one or more individual subcarriers,
    - wherein the symbol rate and the FEC rate are balanced to preserve a data rate for each individual subcarrier of the one or more individual subcarriers.

2. The system of claim 1, wherein the optical transponder is further configured to adjust a symbol rate of the one or more individual subcarriers.

3. The system of claim 1, wherein the optical transponder is further configured to adjust a bandwidth of the one or more individual subcarriers without changing an overall bandwidth of the optical signal.

4. The system of claim 1, wherein the optical transponder is further configured to adjust an overall bandwidth of the optical signal by adjusting a bandwidth of the one or more individual subcarriers.

5. The system of claim 1, wherein the one or more individual subcarriers is an edge subcarrier of the optical signal and the optical transponder is configured to adjust the one or more individual subcarriers to reduce an impact of passband narrowing.

6. The system of claim 1, wherein the one or more individual subcarriers is a center subcarrier of the optical signal and the optical transponder is configured to adjust the one or more individual subcarriers to reduce an impact of non-linear interference.

7. A method comprising:

generating an optical signal including a plurality of subcarriers; and performing a signal-to-noise ratio (SNR) equalization process with respect to the plurality of subcarriers based on an SNR factor associated with propagation of the optical signal along an optical signal path, the SNR equalization process including respectively adjusting, for one or more individual subcarriers of the plurality of subcarriers:

a forward-error-correction (FEC) rate respectively corresponding to the one or more individual subcarriers; and a symbol rate respectively corresponding to the one or more individual subcarriers, wherein the symbol rate and the FEC rate are balanced to preserve a data rate for each individual subcarrier of the one or more individual subcarriers.

8. The method of claim 7, further comprising increasing a symbol rate of the one or more individual subcarriers.

9. The method of claim 7, further comprising adjusting a bandwidth of the one or more individual subcarriers without changing an overall bandwidth of the optical signal.

10. The method of claim 7, further comprising adjusting an overall bandwidth of the optical signal by adjusting a bandwidth of the one or more individual subcarriers.

11. The method of claim 7, wherein the optical signal path is a metro signal path having passband narrowing affecting an edge subcarrier of the one or more individual subcarriers.

12. The method of claim 7, wherein the optical signal path is a long-haul path having non-linear interference affecting a center subcarrier of the one or more individual subcarriers.

13. A non-transitory computer-readable storage medium configured to store instruction that, in response to being executed, causes a system to perform operations, the operations comprising:

generating an optical signal including a plurality of subcarriers; and performing a signal-to-noise ratio (SNR) equalization process with respect to the plurality of subcarriers based on an SNR factor associated with propagation of the optical signal along an optical signal path, the SNR equalization process including respectively adjusting, for one or more individual subcarriers of the plurality of subcarriers, one or more of:

a forward-error-correction (FEC) rate respectively corresponding to the one or more individual subcarriers; and a symbol rate respectively corresponding to the one or more individual subcarriers, wherein the symbol rate and the FEC rate are balanced to preserve a data rate for each individual subcarrier of the one or more individual subcarriers.

14. The operations of claim 13, further comprising increasing a symbol rate of the one or more individual subcarriers.

15. The operations of claim 13, further comprising adjusting a bandwidth of the one or more individual subcarriers without changing an overall bandwidth of the optical signal.

16. The operations of claim 13, further comprising adjusting an overall bandwidth of the optical signal by adjusting a bandwidth of the one or more individual subcarriers.

17. The operations of claim 13, wherein the optical signal path comprises a metro transmission path in which passband narrowing affects an edge subcarrier of the one or more individual subcarriers or a long-haul path in which cross-modulation affects a center subcarrier of the one or more individual subcarriers.

* * * * *